(12) United States Patent
Chung

(10) Patent No.: US 10,654,311 B2
(45) Date of Patent: May 19, 2020

(54) CENTER LOCK SIMULATED CAP ASSEMBLY FOR AN AUTOMOBILE WHEEL

(71) Applicant: Design Infini, Inc., Corona, CA (US)

(72) Inventor: Suny Chung, Anaheim, CA (US)

(73) Assignee: Design Infini, Inc., Corona, CA (US)

( * ) Notice: Subject to any disclaimer, the term of this patent is extended or adjusted under 35 U.S.C. 154(b) by 168 days.

(21) Appl. No.: 15/968,577

(22) Filed: May 1, 2018

(65) Prior Publication Data

US 2018/0319209 A1 Nov. 8, 2018

Related U.S. Application Data

(60) Provisional application No. 62/500,351, filed on May 2, 2017.

(51) Int. Cl.
| | | |
|---|---|---|
| *B60B 3/10* | (2006.01) | |
| *B60B 7/04* | (2006.01) | |
| *B60B 7/14* | (2006.01) | |
| *B60B 7/18* | (2006.01) | |
| *B60B 7/06* | (2006.01) | |
| *B60B 7/00* | (2006.01) | |

(52) U.S. Cl.
CPC .............. *B60B 7/0013* (2013.01); *B60B 3/10* (2013.01); *B60B 7/04* (2013.01); *B60B 7/066* (2013.01); *B60B 7/14* (2013.01); *B60B 7/18* (2013.01); *B60B 2900/572* (2013.01)

(58) Field of Classification Search
CPC ........... B60B 7/0013; B60B 7/04; B60B 7/14; B60B 7/066; B60B 7/18; B60B 3/10
See application file for complete search history.

(56) References Cited

U.S. PATENT DOCUMENTS

| 2,906,558 | A | * | 9/1959 | Forbush | B60B 3/18 |
| | | | | | 301/35.63 |
| 4,544,209 | A | * | 10/1985 | Braungart | F16B 41/005 |
| | | | | | 301/108.5 |
| 5,435,631 | A | * | 7/1995 | Maloney | B60B 7/00 |
| | | | | | 301/37.36 |
| D592,118 | S | * | 5/2009 | Chung | 12/16 |
| D639,717 | S | * | 6/2011 | Chung | D12/211 |
| 2012/0080932 | A1 | * | 4/2012 | Ilse | B60B 7/0086 |
| | | | | | 301/6.3 |
| 2014/0103701 | A1 | * | 4/2014 | Chung | B60B 3/008 |
| | | | | | 301/108.1 |

FOREIGN PATENT DOCUMENTS

FR 640092 A * 7/1928 ............... B60B 7/14

* cited by examiner

*Primary Examiner* — Kip T Kotter
(74) *Attorney, Agent, or Firm* — Knobbe, Martens, Olson & Bear, LLP

(57) ABSTRACT

An automobile wheel having a hub and a cap assembly configured to removably attach to the hub is provided herein. The cap assembly includes a base component, a lug hole cover, and a center cap. The base component is removably coupled to the hub, and includes a cylindrical portion with an outer threaded surface that extends outward from the hub when the base component is coupled to the hub. The lug hole cover removably fits over the cylindrical portion of the base component to cover the plurality of lug hole openings of the hub. Additionally, the center cap is removably coupled to the base component and retain the lug hole cover against the hub.

11 Claims, 11 Drawing Sheets

CENTER LOCK SIMULATED CAP ASSEMBLY FOR AN AUTOMOBILE WHEEL

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 in their entirety and should be considered a part of this specification.

BACKGROUND

Field

The present invention relates generally to automotive wheel accessories and, more particularly, to a cap configured to connect to an existing automotive wheel.

Description of the Related Art

Wheeled vehicles commonly include wheel hub assemblies that are rotatably coupled to the vehicle's axles and threaded wheel studs protruding outward from wheel hub assemblies. The threaded wheel studs are configured to facilitate the attachment of wheels to the wheel hub assemblies. In particular, wheels commonly include a series of openings or lug holes corresponding to the threaded wheel studs or lug bolts on the wheel hub assemblies such that the wheels may be slid onto the threaded wheel studs (lug bolts). Once the threaded wheel studs are received in the openings, the wheels may be secured to the wheel hub assemblies by a series of lug nuts screwed onto ends of the threaded wheel studs (lug bolts). Alternatively, the wheel hub assemblies may include a series of threaded holes and the wheels may be secured to the wheel hub assemblies of the vehicle by a series of lug bolts extending through the openings in the wheels and into the threaded holes in the wheel hub assemblies. Additionally, wheels also commonly include a center bore for receiving a hub protruding outward from the wheel hub assembly.

However, exposed lug holes or lug nuts can be unseemly and be aesthetically not pleasing, disrupting the contours of the wheel design.

SUMMARY

An automobile wheel having a hub and a cap assembly configured to removably attach to the hub is described herein. The cap assembly includes a base component, a lug hole cover, and a center cap. The base component is removably coupled to the hub, and includes a cylindrical portion with an outer threaded surface that extends outward from the hub when the base component is coupled to the hub. The lug hole cover removably fits over the cylindrical portion of the base component to cover the plurality of lug hole openings of the hub. Additionally, the center cap is removably coupled to the base component and retain the lug hole cover against the hub.

The present disclosure is directed to various embodiments of an automobile wheel including an outer rim and a hub defined generally at the center of the automobile wheel. The hub may have a recessed outer surface and a plurality of lug hole openings arranged around a center hub opening. The automobile wheel also includes a base component, a lug hole cover, and a center cap. The base component is removably couplable to the hub to cover the center hub opening, and the base component has an upper cylindrical portion with an outer threaded surface that extends outward from the hub when the base component is coupled to the hub. The lug hole cover has a center opening configured to fit over the upper cylindrical portion of the base component to cover the plurality of lug hole openings of the hub. The center cap has an inner threaded surface configured to threadably couple to the base component so that the inner threaded surface threads onto the outer threaded surface of the base component to thereby retain the lug hole cover against the hub. The lug hole cover extends over and conceals the recessed outer surface of the hub.

The present disclosure is also directed to various embodiments of an automobile wheel including an outer rim and a hub defined generally at the center of the automobile wheel. The hub may have a recessed outer surface and a plurality of lug hole openings arranged around a center hub opening. The automobile wheel also includes a base component, a lug hole cover, and a center cap. The base component is removably couplable to the hub to cover the center hub opening, and the base component has an upper cylindrical portion with an outer threaded surface that extends outward from the hub when the base component is coupled to the hub. The base component further includes a flange configured to be attached to the hub around the center hub opening when the base component is coupled to the hub. The lug hole cover has a center opening configured to fit over the cylindrical portion of the base component to cover the plurality of lug hole openings of the hub. The center cap has an inner threaded surface configured to threadably couple to the base component so that the inner threaded surface threads onto the outer threaded surface of the base component to thereby retain the lug hole cover against the hub. The lug hole cover extends over and conceals the recessed outer surface of the hub.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

Figure 1:
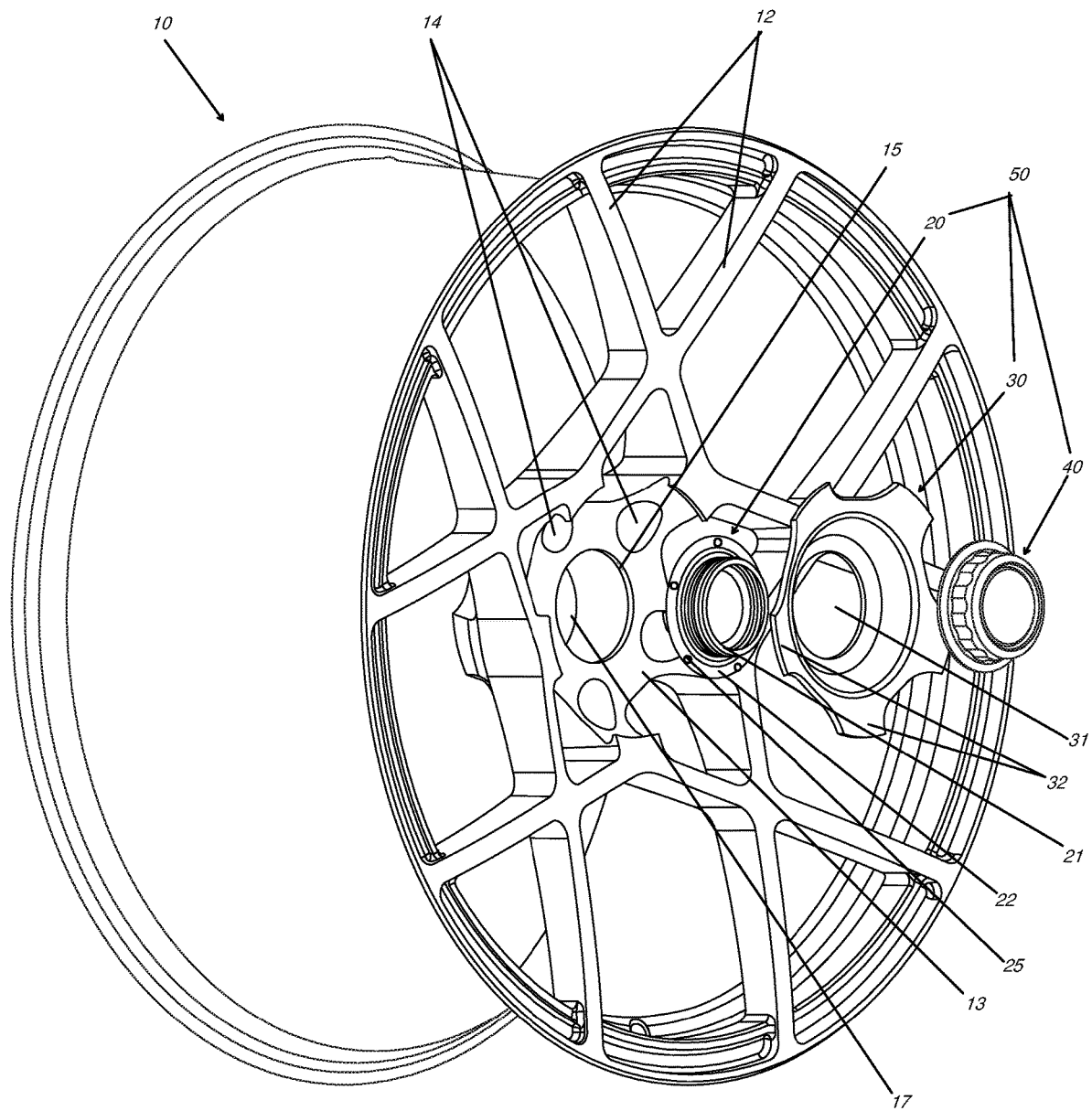
FIG. 1 is an exploded perspective view of a cap assembly according to one embodiment of the present disclosure and an automotive wheel.

The present disclosure is directed to various embodiments of a cap assembly 50 configured to be detachably connected to an automotive wheel 10. In the embodiment illustrated in FIG. 1, the automotive wheel 10 includes a rim 11, a plurality of spokes 12 extending radially inward from the rim 11, a hub 13 disposed at a center-point of the spokes 12, and a plurality of openings or lug holes 14 in the hub 13. In some embodiments, the plurality of openings or lug holes 14 consist of two, three, four, five or more openings or lug holes. The hub 13 may have discontinuous and/or recessed surface relative to the plurality of spokes 12. The hub 13 may have a cavity 17 at its center. The hub 13 may further have one or more indentation or recesses 15. The plurality of openings or lug holes 14 can receive lug bolts to fasten the wheel 10 on a vehicle (not shown here), such as threaded studs or threaded lugs. As used herein, the term "plurality" shall mean two or more, unless expressly stated otherwise.

In some embodiments, the cap assembly 50 consists of a threaded base 20, a lug hole cover 30, and a top simulated center lock 40 (e.g., center cap). The threaded base 20, the lug hole cover 30, and the top simulated center lock 40 can be detachably connected to one another to form the cap assembly 50. In some embodiments, the cap assembly 50 consists of a threaded base 20 and a top simulated center lock 40 without a lug hole cover 30. In such embodiments, the threaded base 20 and the top simulated center lock 40 can be detachably connected to one another to form the cap assembly 50.

The threaded base 20 may have a cylindrical shape. The threaded base 20 may have an upper portion 21 and a lower portion 23 (see FIG. 2B), and either or both of the upper portion 21 and the lower portion 23 may have a cylindrical shape. The threaded base 20 may also include an intermediate disc or flange 22, which may be placed between the upper portion 21 and the lower portion 23, such that the upper portion 21 and the lower portion 23 are defined and/or divided by an intermediate disc 22.

Figure 2A:
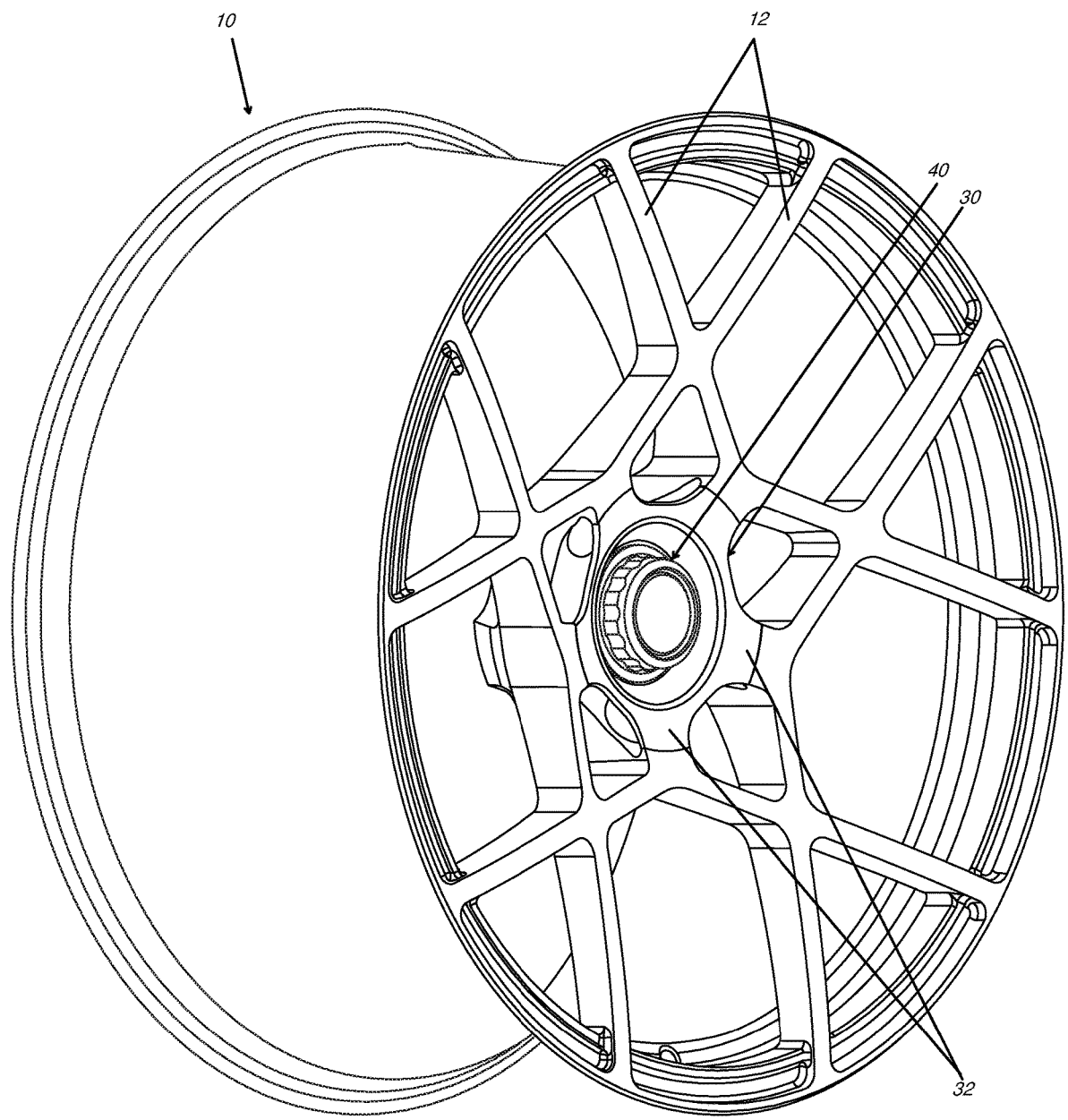
FIG. 2A is a perspective view of the cap assembly according to FIG. 1 detachably connected to the automotive wheel.
Figure 2B:
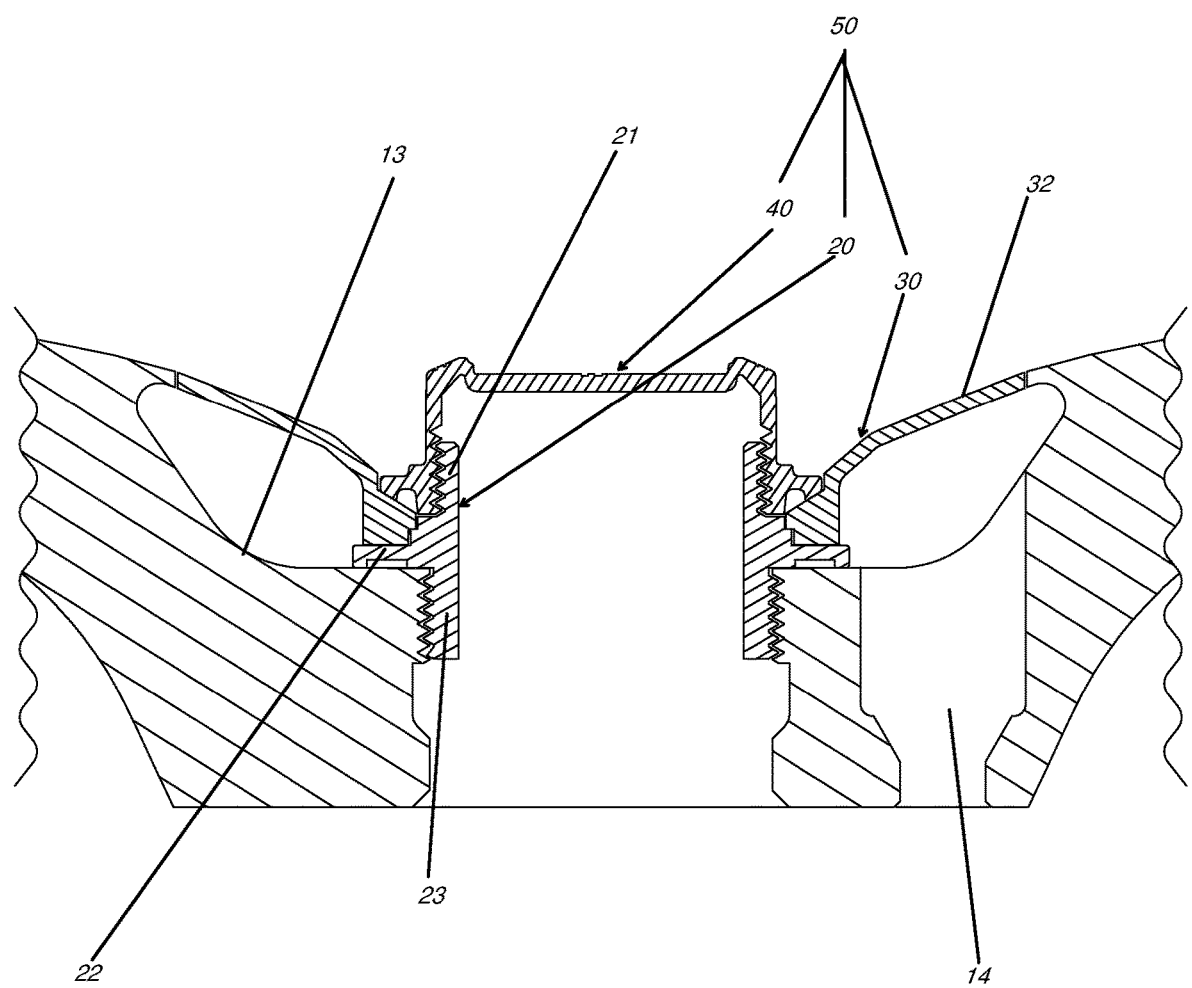
FIG. 2B is a side cross-sectional view of the cap assembly and a portion of the automotive wheel of FIG. 2A.

FIG. 2A illustrates an embodiment of the cap assembly 50 detachably attached to the wheel 10. FIG. 2B is a side cross-sectional view of the embodiment of FIG. 2A, illustrating how the components of the cap assembly 50 and the wheel 10 can be detachably attached. For example, the lower portion 23 can be received by the cavity 17 of the wheel 10, detachably coupling the threaded base 20 to the wheel 10. In some embodiments, the inner surface of the cavity 17 and the outer surface of the lower portion 23 may be threaded so that the threaded base 20 can be detachably coupled to the wheel 10 by screwing the threaded base 20 to the wheel 10.

In other embodiments, the threaded base 20 can be detachably coupled to the wheel 10 by any other suitable means. For example, the base 20 can be attached to the wheel 10 with one or more fasteners (e.g., screws) about the perimeter of the disc 22. The intermediate disc 22 may have one or more protrusion 25 on either side. One or more protrusions 25 on the side facing the hub 13 of the wheel 10 can be received by the one or more indentation or recesses 15 on the hub 13 so that the threaded base 20 can be further secured to the wheel 10 when the threaded base 20 is detachably coupled to the wheel 10. In some embodiments, the upper portion 21 may be threaded. In some embodiments, the upper portion 21 and the lower portion 23 can be both threaded, such that the upper portion and the lower portion are indistinguishable and threaded base 20 can be coupled to the wheel 10 in either way.

In some embodiments, the lug hole cover 30 may have an outer portion 32 and an opening 31 to receive the upper portion 21 of the threaded base 20. The upper portion 21 of the threaded base 20 may extend through the opening 31. Optionally, the opening 31 may be threaded to accept the thread the threaded upper portion 21 of the threaded base 20. The outer portion 32 of the lug hole cover 30 can at least partially cover the plurality of openings or lug holes 14 in the wheel 10 when the cap assembly 50 is detachably connected to the wheel 10. In some embodiments such as shown in FIGS. 1-2B, the plurality of openings or lug holes 14 may be completely covered by the lug hole cover 30 such that the plurality of openings or lug holes 14 may not be visible from the side of the wheel 10 where the cap assembly 50 is installed. In other embodiments, the plurality of openings or lug holes 14 are at least partially visible from the side of the wheel 10 when the cap assembly 50 is installed. In some embodiments, there is a gap between the lug hole cover 30 and the hub 13, such that the plurality of openings or lug holes 14 are at least partially exposed.

In some embodiments such as shown in FIGS. 1-2B, the lug hole cover 30 is shaped to be fit in to the recessed portion of the hub 13. In some embodiments such as shown in FIGS. 1-2B, the outer portion 32 of the cover 30 is shaped to form a continuous extension of the plurality of spokes 12 or any other patterns on the wheel 10, such that the lug hole cover 30 blends into the wheel 10 when the cap assembly 50 is detachably coupled with the wheel 10. The lug hole cover 30 may have one or more indentations (not shown) on the side facing the threaded base 20, the one or more indentations can accept the one or more protrusions 25 of the threaded base 20, such that the lug hole cover 30 would not rotate around the threaded base 20 when the cap assembly 50 is detachably connected to the wheel 10.

In some embodiments (see e.g., FIGS. 2, 6, 8 and 10), when the cap assembly 50 is coupled to the wheel 10, at least part of the lug hole cover 40 is spaced away from the hub 13, such that the cap assembly 50 is a floating cap. In some embodiments (see e.g., FIG. 4), the lug hole cover 30 is not spaced away from the hub 13, but instead sits in the recessed surface of the hub 13 flush with the rest of the wheel 10.

In some embodiments, the top simulated center lock 40 can receive the upper portion 21 of the threaded base 20 extending through the lug hole cover 30 such that the center lock 40 is detachably connected to the threaded base 20. In some embodiments, the inner surface of the top simulated center lock 40 may be threaded such that the top simulated center lock 40 can be detachably coupled to the upper portion 21 by screwing the center lock 40 to the threaded base 20. In other embodiments, the center lock 40 can be detachably coupled to the threaded base 20 by any other suitable means. In some embodiments, the center lock 40 can completely receive the upper portion 21 of the threaded base 20 such that there would be no gap between the intermediate rim 22 of the threaded base 20 and the center lock 40 when cap assembly 50 is fully connected to the wheel 10. In other embodiments, the center lock 40 can receive only part of the upper portion 21 such that there is a gap between the intermediate rim 22 of the threaded base 20 and the center lock 40 when the cap assembly 50 is fully connected to the wheel 10. In some configurations, the center lock 40 (e.g., center cap) may be coupled to the threaded base 20 without the lug hole cover 30, such that the lug holes 14 are exposed when the assembly of the threaded base 20 and the center lock 40 is coupled to the wheel.

In some embodiments, the upper portion 21 and the lower portion 23 of the threaded base 20 may have identical or substantially similar shape and/or dimensions, such that either of the upper portion 21 and the lower portion 23 of the threaded base 20 may be coupled to the hub 13, and/or either of the upper portion 21 and the lower portion 23 of the threaded base 20 may be coupled to the center lock 40. In other embodiments, the upper portion 21 and the lower portion 23 of the threaded base 20 may have different shape or dimensions. In some embodiment, a plurality of threaded bases 20 with various shapes and/or dimensions of the upper portion 21 and the lower portion 23 are provided to the user, such that the user may choose the threaded base 20 appropriate for different wheels and/or center locks. In some embodiments, the center lock 40 may have series of depressions in the outer surface arranged to emulate the appearance of a center lock fastener. The simulated center lock fastener may aid in deterring theft of the cap assembly 50 by obfuscating the proper mechanism for detaching the cap assembly 50 from the wheel 10.

The cap assembly 50 and its components, such as the threaded base 20, the lug hole cover 30, and the simulated cap 40, may have various shapes and features depending on, for example, the shape of the wheel 10 and its spokes 12. FIGS. 3-10 illustrate examples of different embodiments of a cap assembly 50A-D and an automotive wheel 10A-D. Each of the wheel 10A-D and the cap assembly 50A-D are constructed similar to the wheel 10 and the cap assembly 50 shown in FIGS. 1-2, respectively, except as noted below. Thus, the reference numerals used to designate the various components of the wheel 10A-D and the cap assembly 50A-D are identical to those used for identifying the corresponding components of the wheel 10 and the cap assembly 50, except that a "A," "B," "C," or "D" has been added to the reference numerals.

Figure 3:
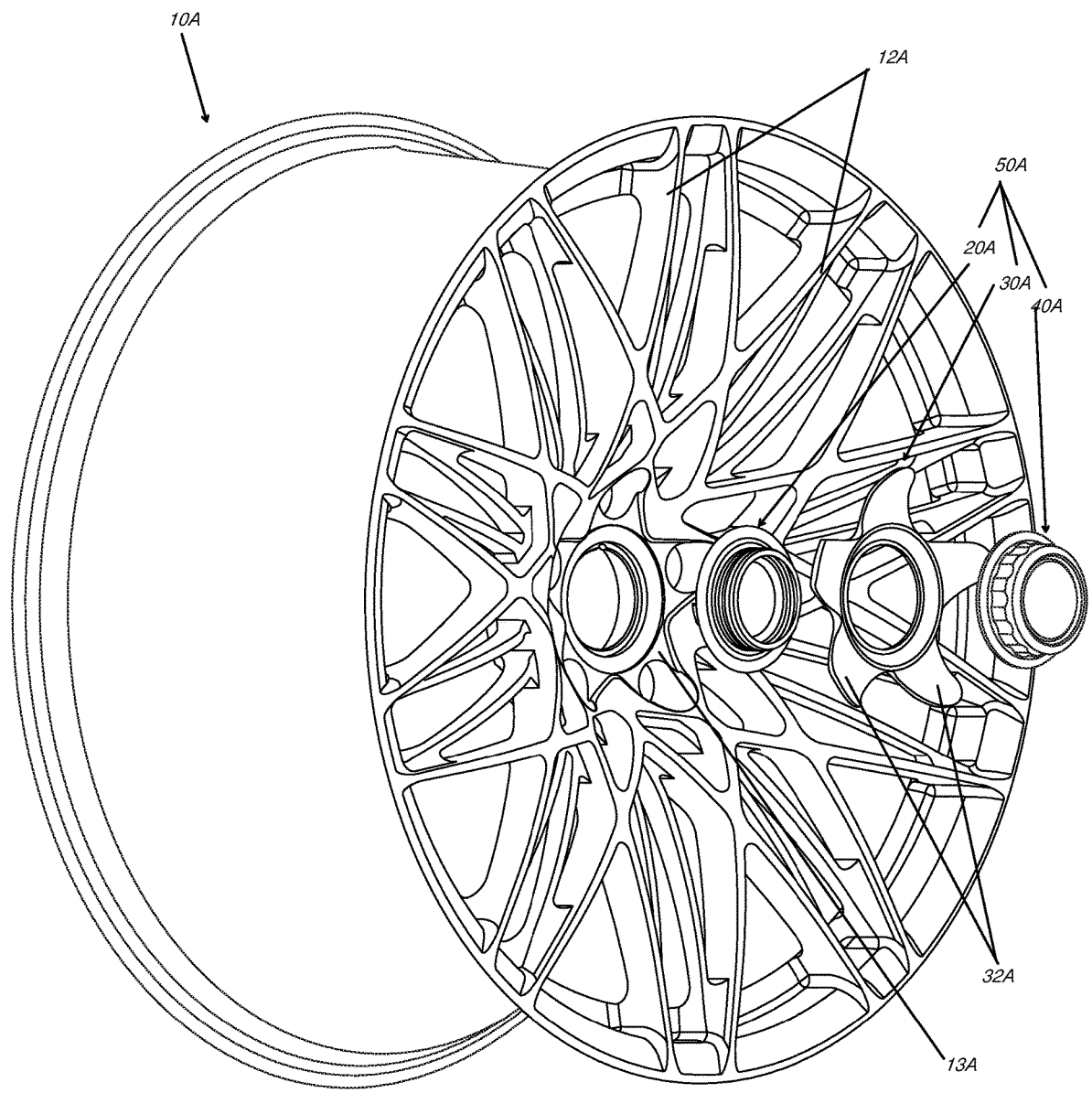
FIG. 3 is an exploded perspective view of a cap assembly according to another embodiment of the present disclosure and an automotive wheel.
Figure 4:
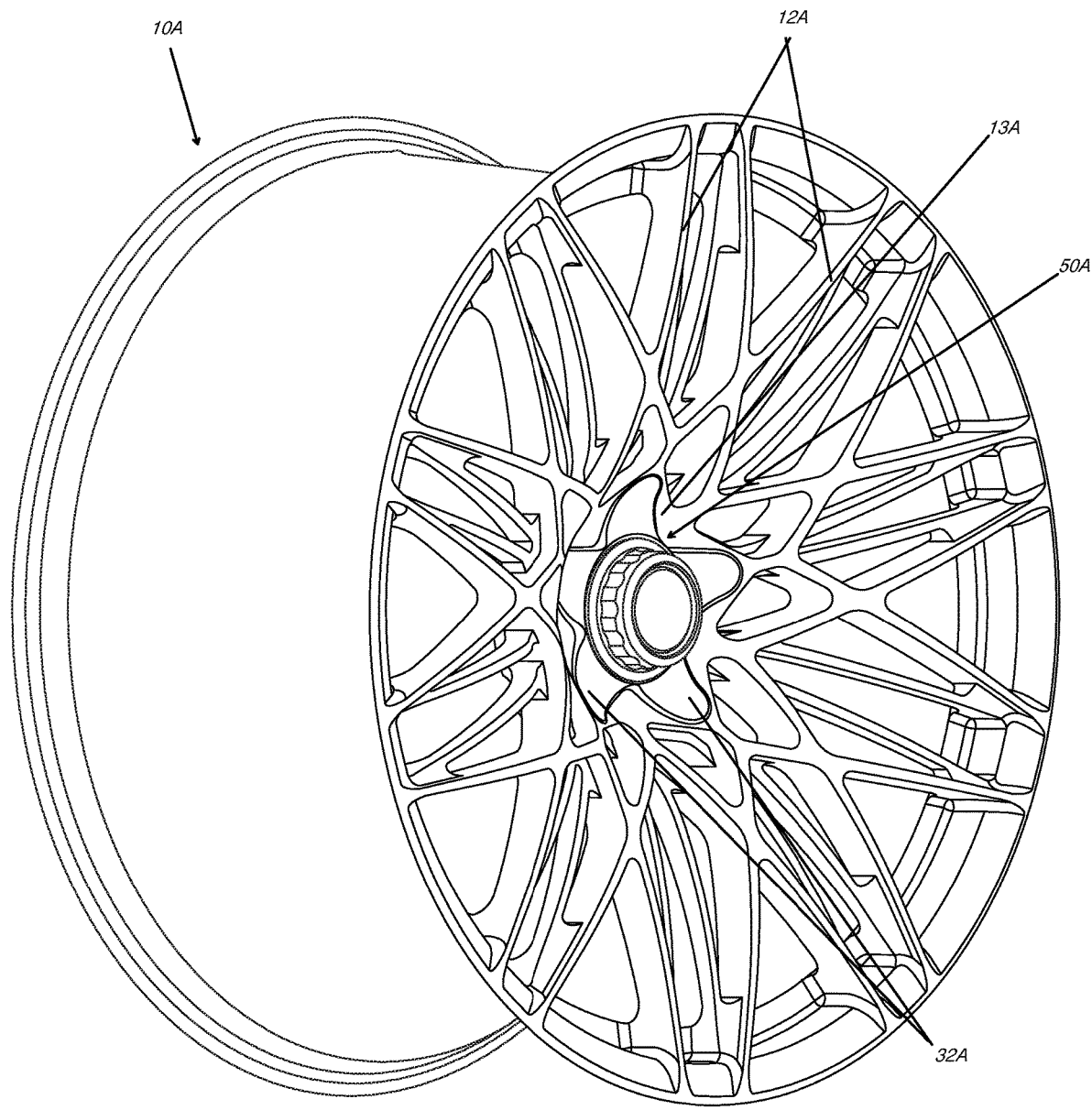
FIG. 4 is a perspective view of the cap assembly according to FIG. 3 detachably connected to the automotive wheel.

In some embodiments, such as shown in FIGS. 3-4, the outer portion 32A of the lug hole cover 30A may be star-shaped. The hub 13A may be shaped to receive the star-shaped lug hole cover 30A when the cap assembly 50A is attached to the wheel 10A, such that the spokes 12A, hub 13A, and the lug hole cover 30A constitutes a substantially continuous surface.

Figure 5:
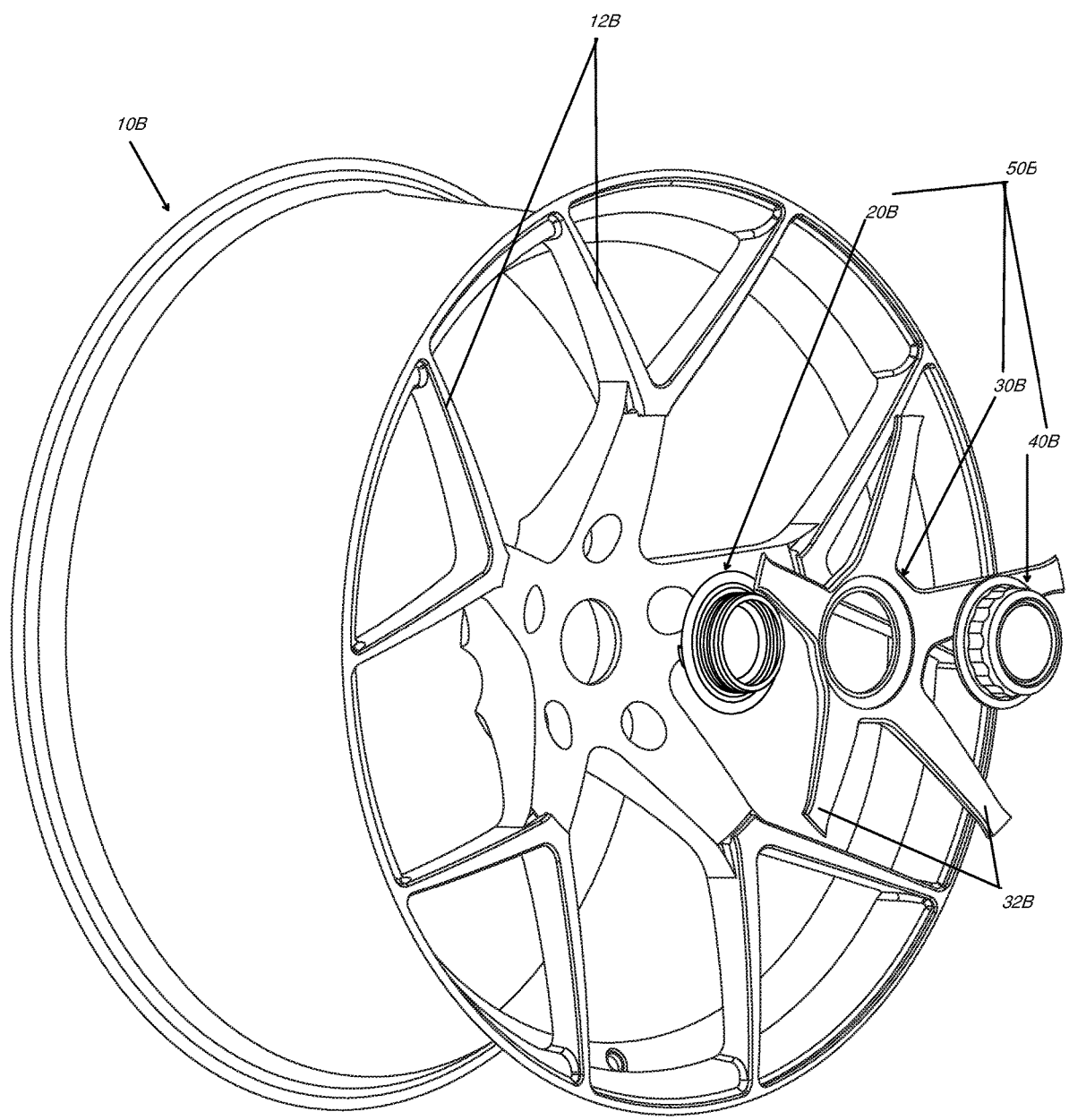
FIG. 5 is an exploded perspective view of a cap assembly according to another embodiment of the present disclosure and an automotive wheel.
Figure 6:
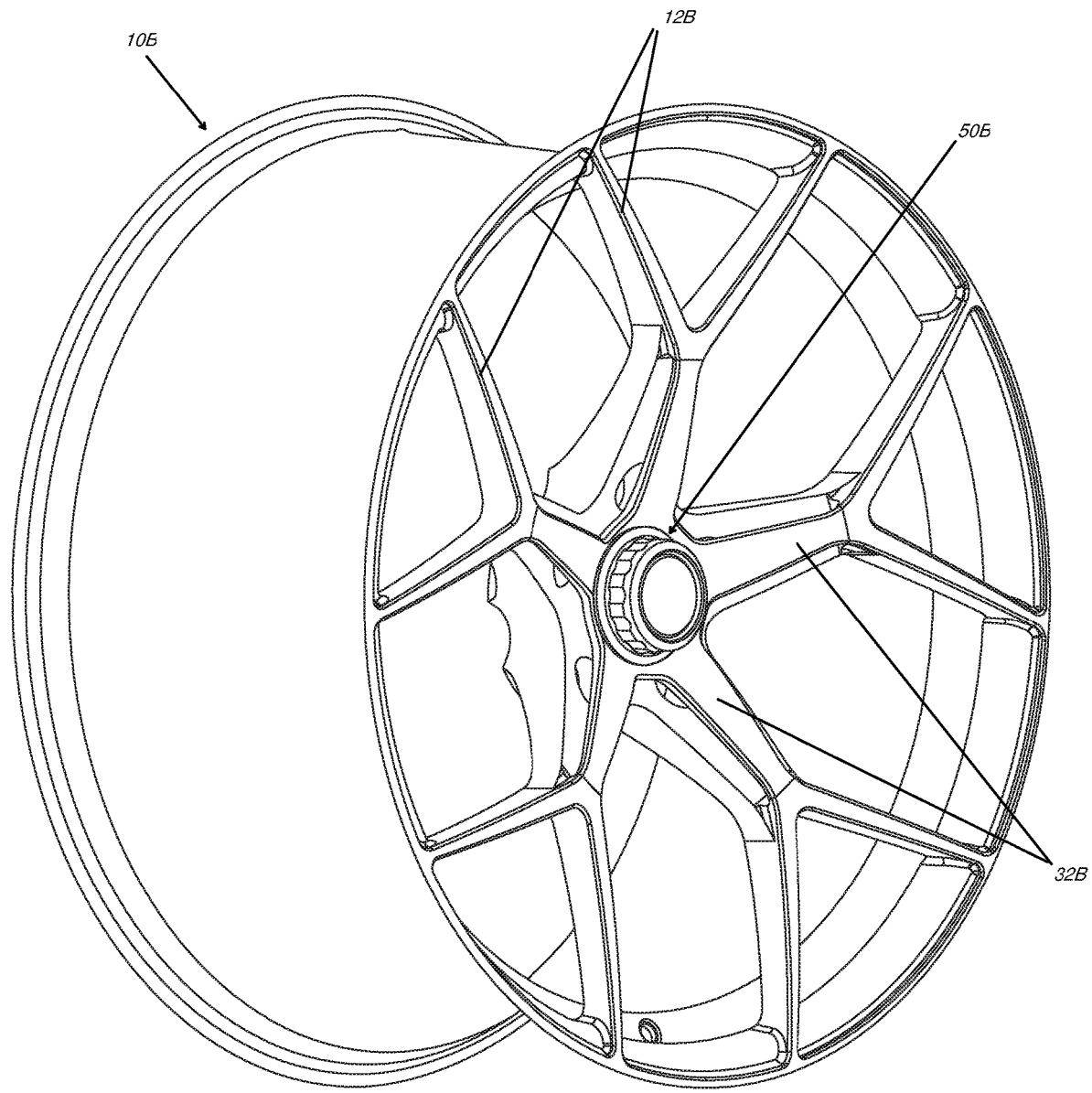
FIG. 6 is a perspective view of the cap assembly according to FIG. 5 detachably connected to the automotive wheel.

In some embodiments, such as shown in FIGS. 5-6, the outer portion 32B of the lug hole cover 30B may have five elongated spokes. The outer portion 32B may have two, three, four, seven, eight, nine or more elongated spokes extending outward. The spokes 12B may be shaped such that the spokes 12B extend from the end of each elongated spoke of the lug hole cover 30B when the cap assembly 50B is attached to the wheel 10B.

Figure 7:
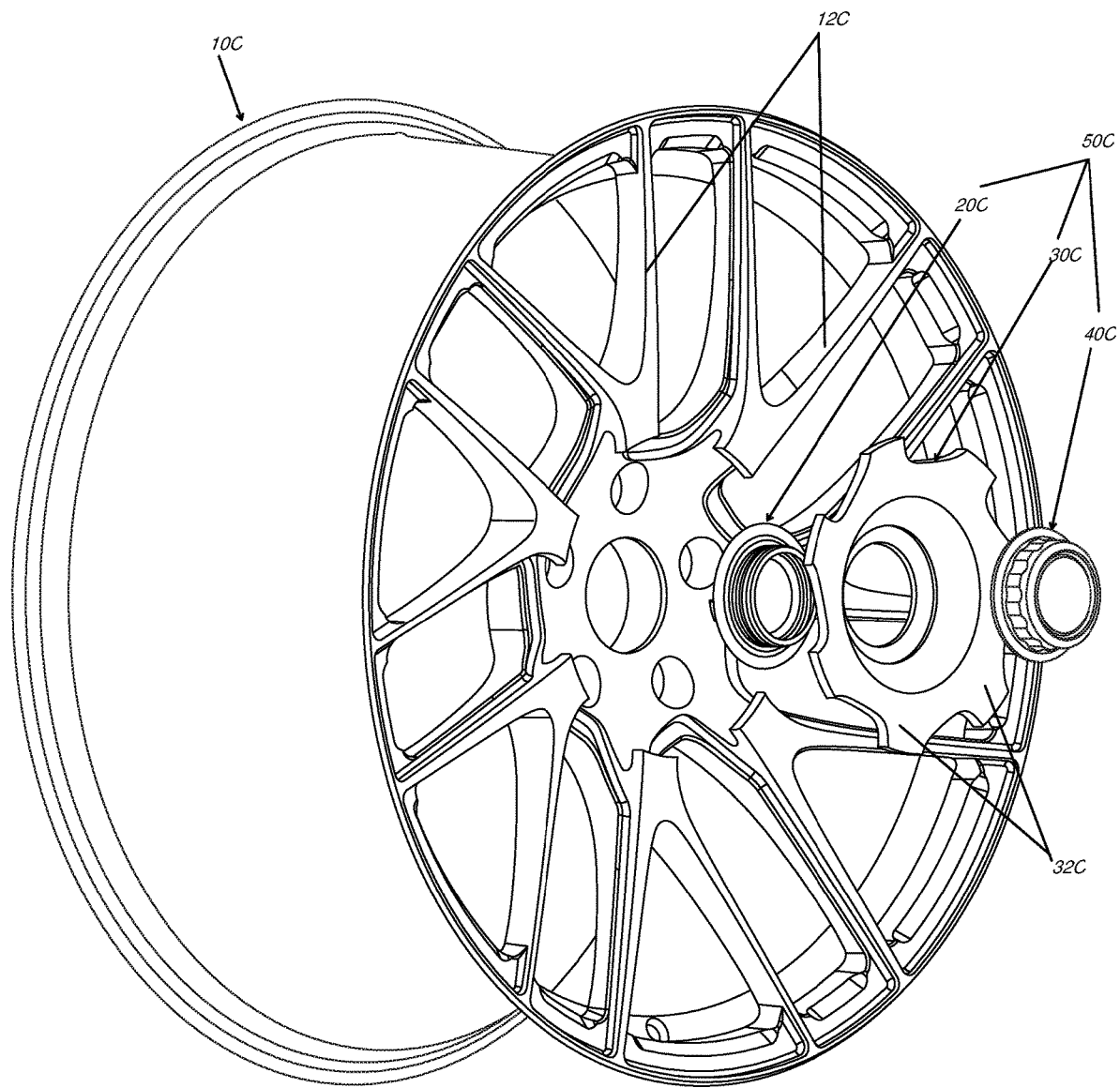
FIG. 7 is an exploded perspective view of a cap assembly according to another embodiment of the present disclosure and an automotive wheel.
Figure 8:
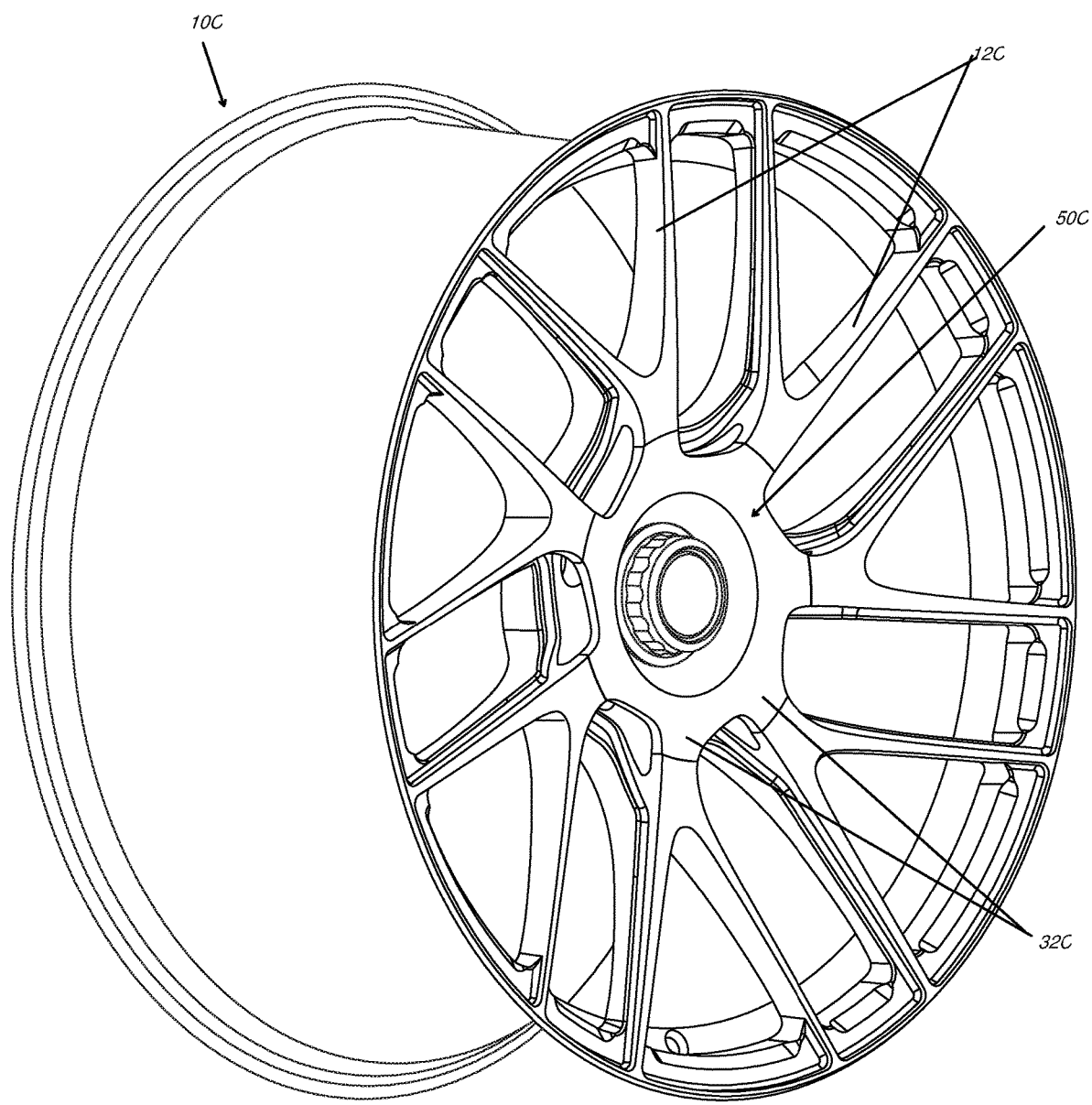
FIG. 8 is a perspective view of the cap assembly according to FIG. 7 detachably connected to the automotive wheel.

In some embodiments, such as shown in FIGS. 7-8, the outer portion 32C of the lug hole cover 30C may have six teeth or spokes extending outward unlike the lug hole cover 30 of FIGS. 1-2 which has five teeth or spokes. In some embodiments, the outer portion of the lug hole cover 30 may have two, three, four, seven, eight, nine or more teeth or spokes extending outward. The spokes 12C may be shaped in accordance with the number of teeth or spokes extending outward in the outer portion 32C of the lug hole cover 30C, such that each of spokes 12C extends from the outer portion 32C of the lug hole cover 30C when the hub assembly 50C is attached to the wheel 10C.

Figure 9:
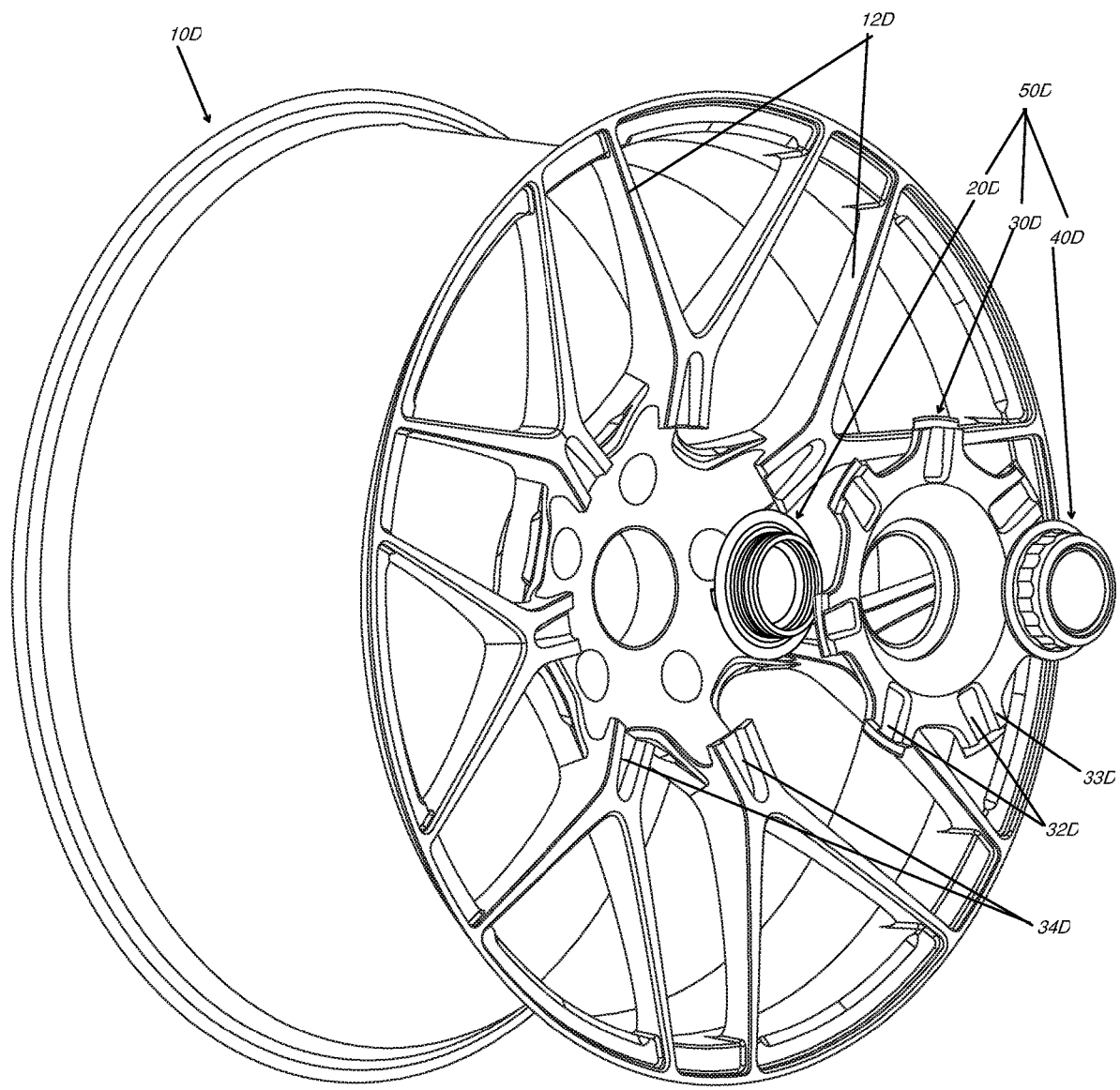
FIG. 9 is an exploded perspective view of a cap assembly according to another embodiment of the present disclosure and an automotive wheel.
Figure 10:
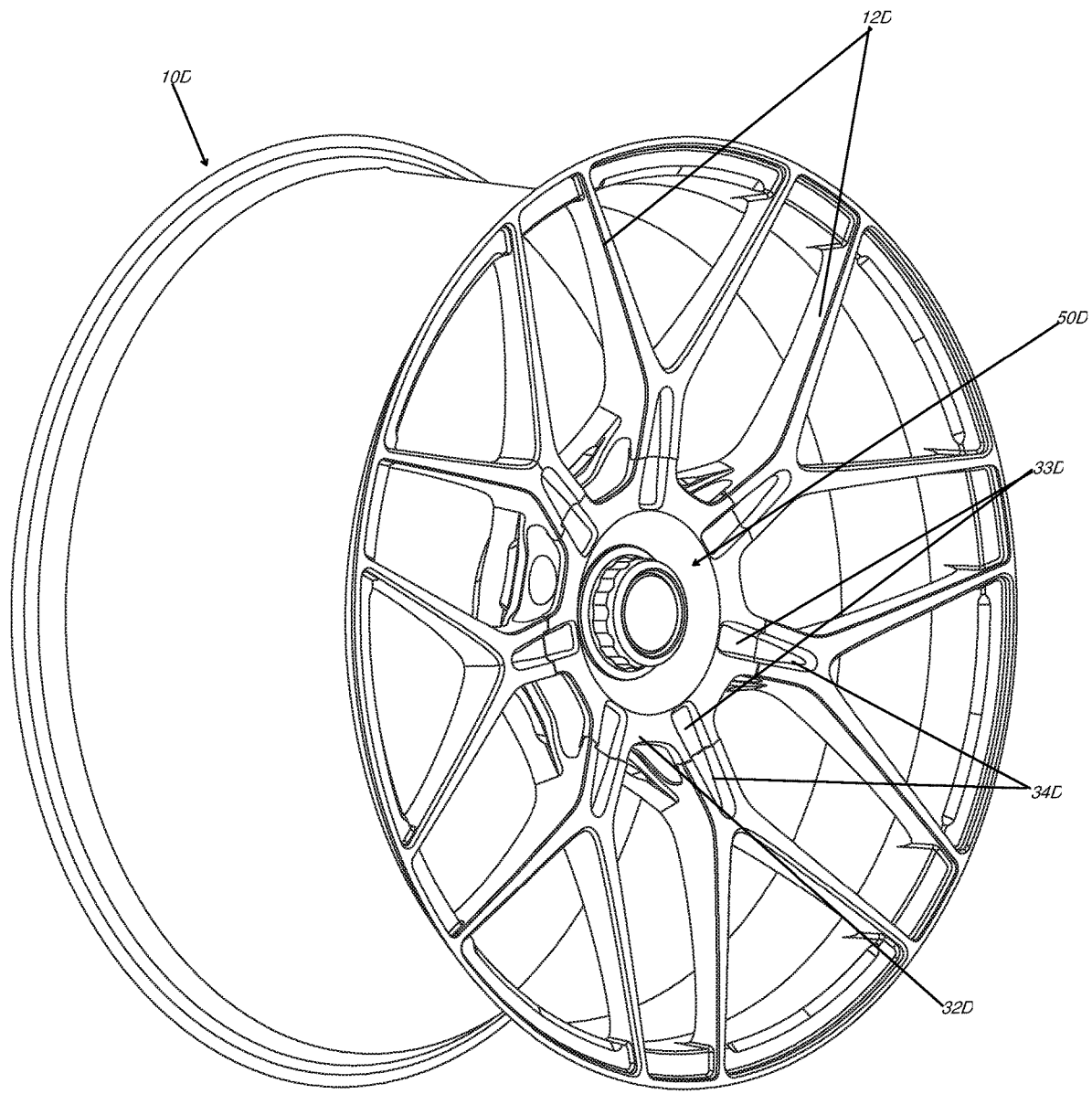
FIG. 10 is a perspective view of the cap assembly according to FIG. 9 detachably connected to the automotive wheel.

In some embodiments, such as shown in FIGS. 9-10, the outer portion 32D of the lug hole cover may have groove 33D on its surface. The spokes 12D may have grooves 34D such that the groove 33D on outer portion 32D of the lug hole cover continues to the groove 34D on the spokes 12D when the wheel assembly 50D is attached on the wheel 10D.

In some embodiments, each of the cap assembly, for example the cap assembly 50 and 50A-D may have identical threaded base and/or simulated cap, such that the threaded base 20 and/or the simulated cap 40 can be used for embodiments described in relation with FIGS. 3-10. Lug hole covers 30 and 30A-D may be shaped such that it can be used interchangeably with a single threaded base and/or a single simulated cap.

Though in the embodiments described above, the lug hole cover 30-30D has an outer portion 32-32D with shapes as shown in the figures and described above, one of skill in the art will recognize that the lug hole cover can have an outer portion with other suitable shapes.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An automobile wheel, comprising:
   an outer rim;
   a hub defined generally at the center of the automobile wheel, the hub having a recessed outer surface and a plurality of lug hole openings arranged around a center hub opening;
   a base component removably couplable to the hub to cover the center hub opening, the base component having an upper cylindrical portion with a first outer threaded surface that is configured to extend outward from the hub when the base component is coupled to the hub;
   a lug hole cover having a center opening configured to fit over the upper cylindrical portion of the base component to cover the plurality of lug hole openings of the hub; and
   a center cap with an inner threaded surface configured to threadably couple to the base component so that the inner threaded surface of the center cap threads onto the outer threaded surface of the base component to thereby retain the lug hole cover against the hub,
   wherein the lug hole cover extends over and conceals the recessed outer surface of the hub,
   wherein at least a portion of the lug hole cover is configured to be interposed between the center cap and the base component while directly contacting the center cap and the base component, when the center cap, the base component and the lug hole cover are coupled together.

2. The automobile wheel of claim 1, wherein the base component further comprises a lower cylindrical portion with a second outer threaded surface, the lower cylindrical portion configured to threadably couple to the hub so that the second outer threaded surface of the base component threads onto an inner threaded surface of the center hub opening.

3. The automobile wheel of claim 2, wherein the base component further comprises a flange between the upper cylindrical portion and the lower cylindrical portion, the flange configured to be attached to the hub about the center hub opening when the base component is coupled to the center hub opening.

4. The automobile wheel of claim 1, further comprising a first plurality of spokes that extends between the outer rim and the hub, wherein the lug hole cover comprises a second plurality of spokes that substantially align with the first plurality of spokes.

5. The automobile wheel of claim 1, wherein the lug hole cover is generally star shaped.

6. The automobile wheel of claim 1, wherein an outer surface of the lug hole cover is configured to align with an outer surface of the wheel between the hub and the outer rim to define a continuous surface.

7. An automobile wheel, comprising:
an outer rim;
a hub defined generally at the center of the automobile wheel, the hub having a recessed outer surface and a plurality of lug hole openings arranged around a center hub opening;
a base component removably couplable to the hub to cover the center hub opening, the base component having
   an upper cylindrical portion with a first outer threaded surface that is configured to extend outward from the hub when the base component is coupled to the hub; and
   a flange configured to be attached to the hub around the center hub opening when the base component is coupled to the hub;
a lug hole cover having a center opening configured to fit over the cylindrical portion of the base component to cover the plurality of lug hole openings of the hub; and
a center cap with an inner threaded surface configured to threadably couple to the base component so that the inner threaded surface of the center cap threads onto the outer threaded surface of the base component to thereby retain the lug hole cover against the hub,
wherein the lug hole cover extends over and conceals the recessed outer surface of the hub,
wherein the flange is further configured to be positioned between the hub and the lug hole cover when the base component and the lug hole cover is coupled to the hub.

8. The automobile wheel of claim 7, wherein the base component further comprises a lower cylindrical portion with a second outer threaded surface, the lower cylindrical portion configured to threadably couple to the hub so that the second outer threaded surface of the base component threads onto an inner threaded surface of the center hub opening, wherein the flange of the base component is located between the lower cylindrical portion and the upper cylindrical portion.

9. The automobile wheel of claim 7, further comprising a first plurality of spokes that extends between the outer rim and the hub, wherein the lug hole cover comprises a second plurality of spokes that substantially align with the first plurality of spokes.

10. The automobile wheel of claim 7, wherein the lug hole cover is generally star shaped.

11. The automobile wheel of claim 7, wherein an outer surface of the lug hole cover is configured to align with an outer surface of the wheel between the hub and the outer rim to define a continuous surface.

* * * * *